United States Patent [19]

Bolton et al.

[11] Patent Number: 4,969,329
[45] Date of Patent: Nov. 13, 1990

[54] TWO CYCLE ENGINE WITH EXHAUST EMISSION CONTROL

[75] Inventors: Robert A. Bolton, Rochester; Albert A. Miller, Warren; Paul E. Reinke, Rochester; Roger B. Krieger, Birmingham, all of Mich.

[73] Assignee: General Motors Corporation, Detroit, Mich.

[21] Appl. No.: 347,634

[22] Filed: May 5, 1989

[51] Int. Cl.$^5$ ............................................. F01N 3/28
[52] U.S. Cl. ...................................... 60/288; 60/284; 60/294; 60/301; 60/314; 123/65 P E
[58] Field of Search ................. 60/274, 279, 314, 294, 60/301, 324, 284, 288; 123/65 PE

[56] References Cited

U.S. PATENT DOCUMENTS

| | | | |
|---|---|---|---|
| 1,477,994 | 12/1923 | Buchi | 60/314 |
| 2,393,341 | 1/1946 | Schneider | 123/65 P E |
| 3,670,502 | 6/1972 | Firey | 60/324 |
| 4,121,552 | 10/1978 | Mithue et al. . | |
| 44,202,297 | 6/1980 | Oku et al. . | |
| 4,237,832 | 12/1980 | Hartig et al. . | |
| 4,285,311 | 8/1981 | Iio . | |
| 4,304,207 | 12/1981 | Aihara | 60/279 |
| 4,341,188 | 7/1982 | Nerstrom . | |
| 4,388,894 | 6/1983 | Tanaka et al. . | |
| 4,391,234 | 7/1983 | Holzleitner . | |
| 4,399,788 | 8/1983 | Bostelmann . | |
| 4,516,540 | 5/1985 | Nerstrom . | |
| 4,660,514 | 4/1987 | Nerstrom . | |
| 4,672,924 | 6/1987 | Hiasa et al. . | |
| 4,672,925 | 6/1987 | Miyata et al. . | |
| 4,751,899 | 6/1988 | Ohki et al. . | |
| 4,768,473 | 9/1988 | Yamamoto et al. . | |
| 4,774,919 | 10/1988 | Matsuo et al. . | |
| 4,862,689 | 9/1989 | Duret | 60/284 |

FOREIGN PATENT DOCUMENTS 253114  10/1988  Japan .................... 123/65 P E
WO89/03929  5/1989  PCT Int'l Appl. .

OTHER PUBLICATIONS

SAE Technical Paper Series, 871653 entitled A Method of Separating Short-circuit Gas From Exhaust Gas in a Two Stroke Cycle Gasoline Engine (A Good Use Of Exhaust Gas) Kazuo Sato and Masamitsu Nakano, Sep. 14-17 1987.

Chilton's Automotive Industries, May 1988, to Stroke . . . or Not to Stroke?.

*Primary Examiner*—Douglas Hart
*Attorney, Agent, or Firm*—Robert J. Outland

[57] ABSTRACT

A two-stroke cycle spark ignition cylinder fuel injection engine is provided with an exhaust emission control system that separately treats hot blowdown gases and uses the hot treated gases to warm the scavenging gases for further treatment. Various exhaust gas separation concepts are described for use in separating the blowdown and scavenging portions of the exhaust gas discharged from the cylinder exhaust ports.

17 Claims, 7 Drawing Sheets

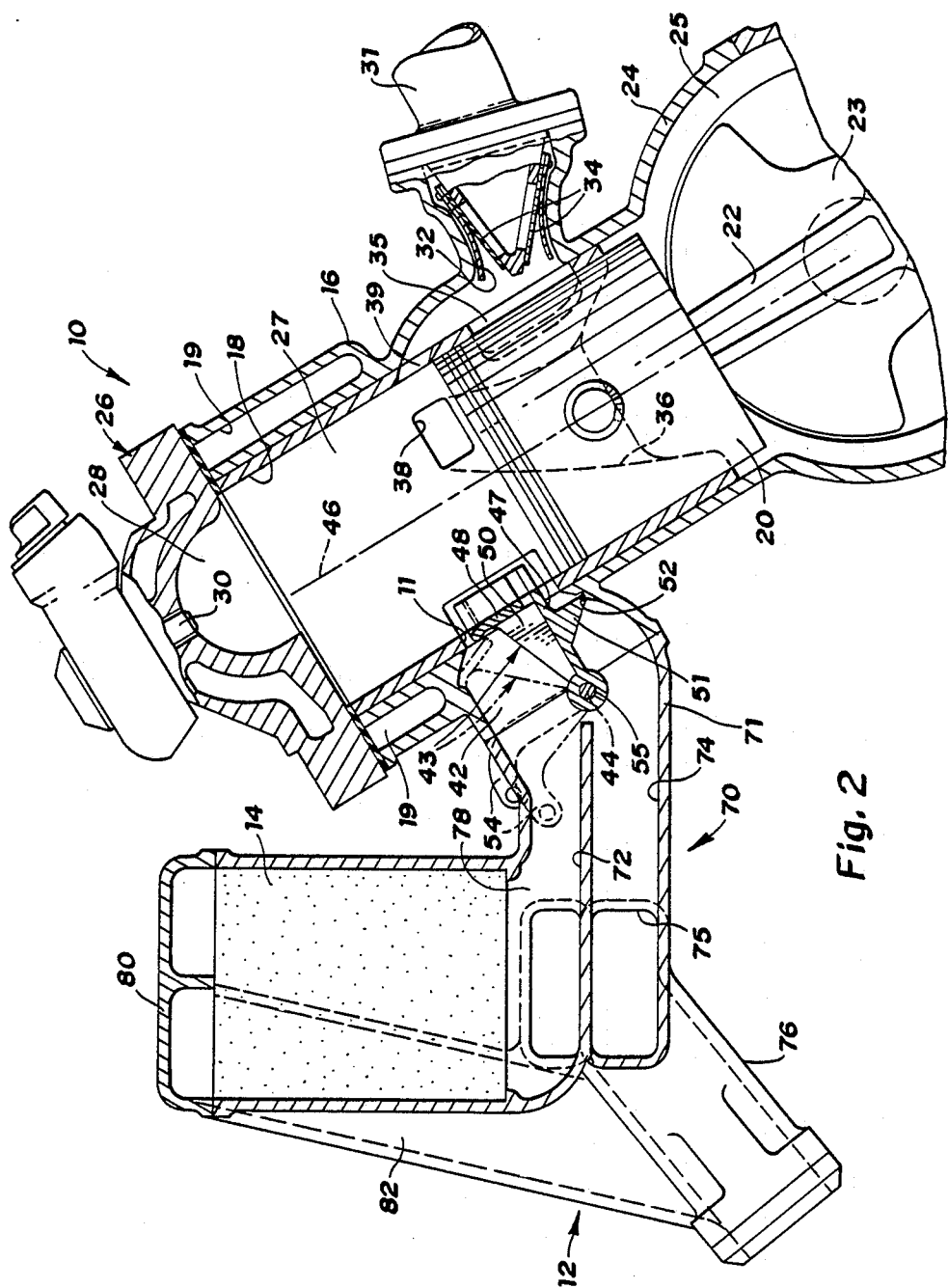

TWO CYCLE ENGINE WITH EXHAUST EMISSION CONTROL

TECHNICAL FIELD

This invention relates to two-stroke cycle internal combustion engines, often referred to for convenience as two-stroke engines or two cycle engines. The invention also relates to exhaust emission control systems for and in combination with such engines. In particular embodiments, the invention relates to divided exhaust flow emission control systems and to means for separating blowdown and scavenging portions of the exhaust gases for exhaust treatment purposes.

BACKGROUND

It is well known that two cycle gasoline engines have not been widely used in automobiles and trucks due, in part at least, to their poor fuel economy and emissions caused by the carryover of fuel to the exhaust gases during the scavenging process. These problems, which are compounded by excessive exhaust smoke caused by the addition of lubricant to the fuel, are among the known shortcomings of the carbureted and crankcase scavenged two cycle engines that are commonly used in lawn mowers, snowmobiles, chain saws, motorcycles and outboard boats, among other uses. On the other hand, two cycle diesel engines in which the fuel is injected into the cylinders near the end of the compression stroke and which generally use blower scavenging with air unmixed with oil have avoided these problems and have been widely used in trucks, locomotives, ships, power plants, oil rigs, inboard boats and various industrial applications.

Recently, interest has developed in two cycle engines using low pressure cylinder fuel injection of gasoline to avoid the problem of fuel carryover into the exhaust gases. Pressure lubrication has also been used to reduce oil carryover. There remains, however, an additional problem of exhaust emission control which bears upon use in automotive vehicles with catalytic converters. The excess air utilized for scavenging of two cycle engine cylinders mixes with the burned gas from combustion in the cylinders and cools the exhaust gases so that the warm-up time for an exhaust catalytic converter becomes excessive, delaying the time to establish adequate emission control after startup. In addition, extended idle or low power operation may cool the converter below its effective operating temperature.

In connection with conventional two cycle engines, of the carbureted type for example, Sato and Nakano in SAE paper 871653 published Sept. 14, 1987 disclosed means for discharging exhaust gas flowing from the cylinder into three sequentially opening exhaust ports for test purposes. With this separation of the exhaust gases, the scavenging mixture discharged through the last to open of the three ports was largely air/fuel mixture, as was shown by running a four cycle engine solely with this segregated exhaust gas as the inlet charge. However, this SAE paper does not suggest any use for selectively separating the exhaust gases in an air scavenged two cycle engine where relatively little unburned fuel remains in the exhaust gases.

SUMMARY OF THE INVENTION

The present invention provides exhaust gas segregating or separating means for a two cycle gasoline engine of the air scavenging type in combination with an emission control system which uses the separated gases to better control exhaust emissions.

In a preferred embodiment, the exhaust gases are separated into (1) higher temperature blowdown gases, which are discharged first from the exhaust port, and (2) the remaining relatively low temperature scavenge gases which are largely diluted with air. The blowdown gases are fed to a close coupled catalytic converter which is quickly heated to operating temperature and begins exothermic conversion reactions that add more heat to the already hot blowdown gases.

The hotter gases leaving the first converter are preferably mixed with the cooler scavenge gases and, if desired, the warmed mixture is then directed into a second catalytic converter to complete the conversion reactions. The startup time of the second converter is also advanced by this arrangement because of the heat added to the system by the reactions taking place in the first converter.

During operation at idle or low power, the exhaust gas separation operates to maintain the close coupled converter hot enough for effective operation, thereby maintaining effective emission control.

The invention further provides a number of alternative means adapted for use in separating the blowdown and scavenging gases discharged from the exhaust ports of a two cycle engine.

These and other features and advantages of the invention will be more fully understood from the following description of certain specific embodiments taken together with the accompanying drawings.

BRIEF DRAWING DESCRIPTION

In the drawings:

FIG. 2 is a transverse cross-sectional view through one cylinder and the exhaust manifold of an engine with an emission control system having an adjustable exhaust separation and timing control according to the invention;

Figure 3A:
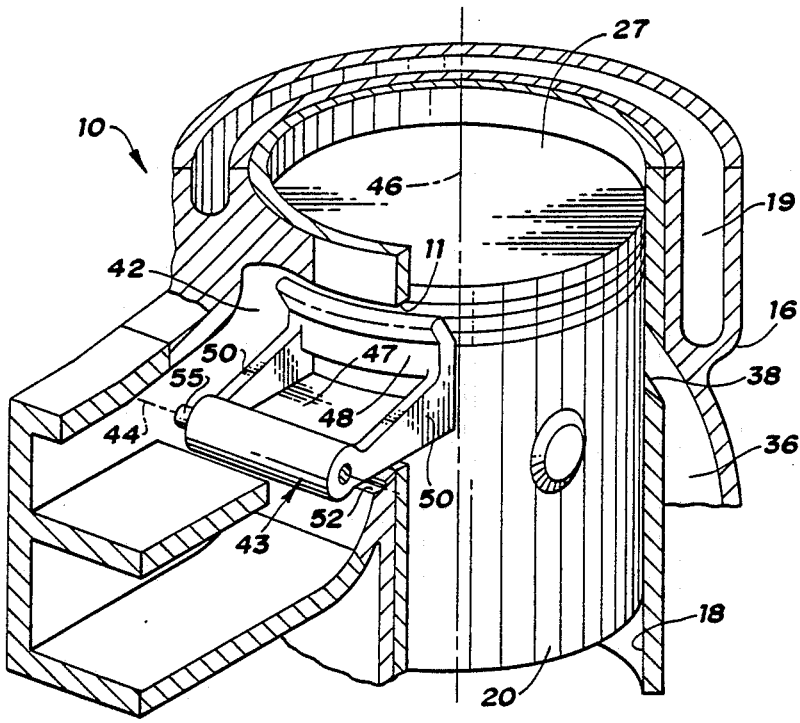
Figure 4:
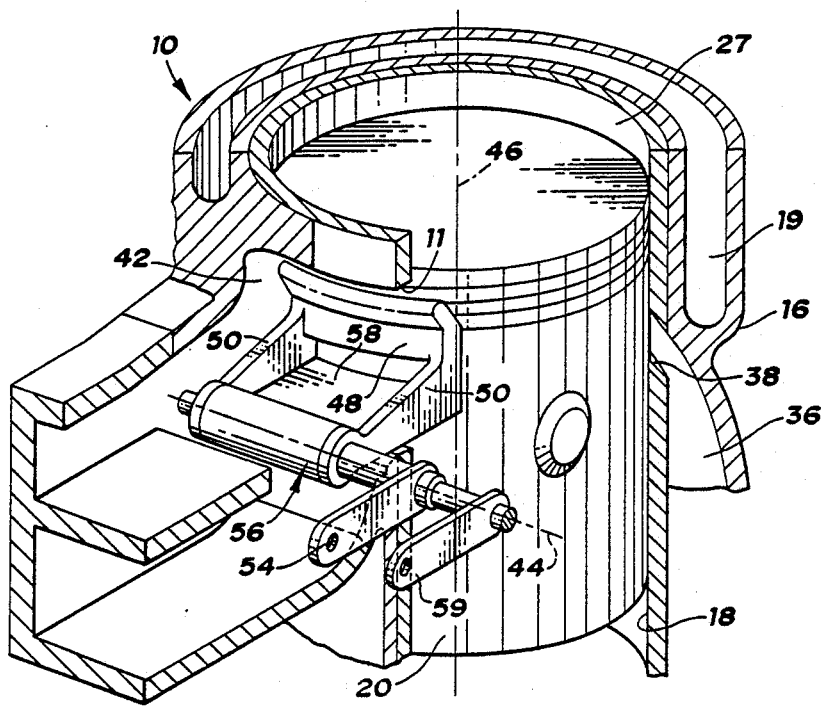
Figure 5:
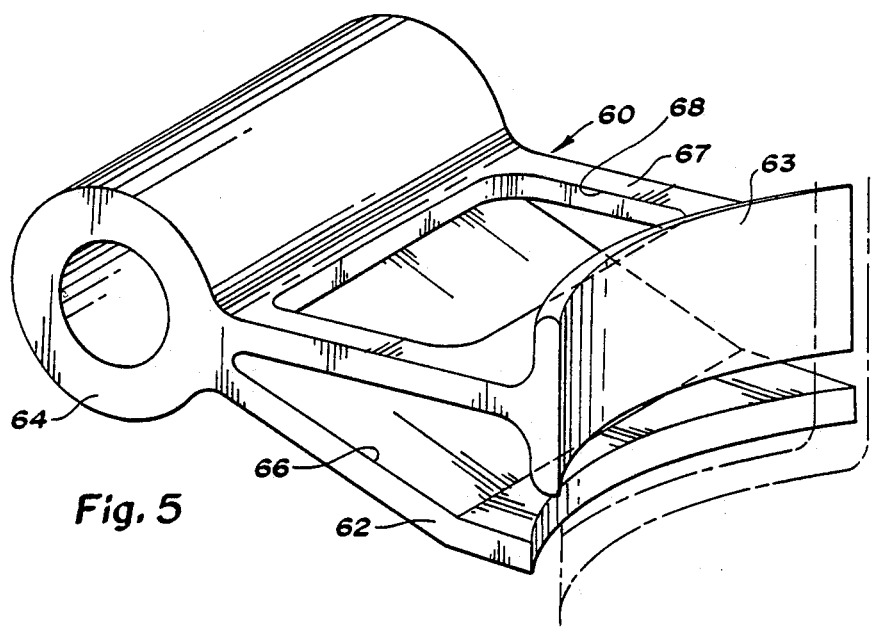
Figure 6:
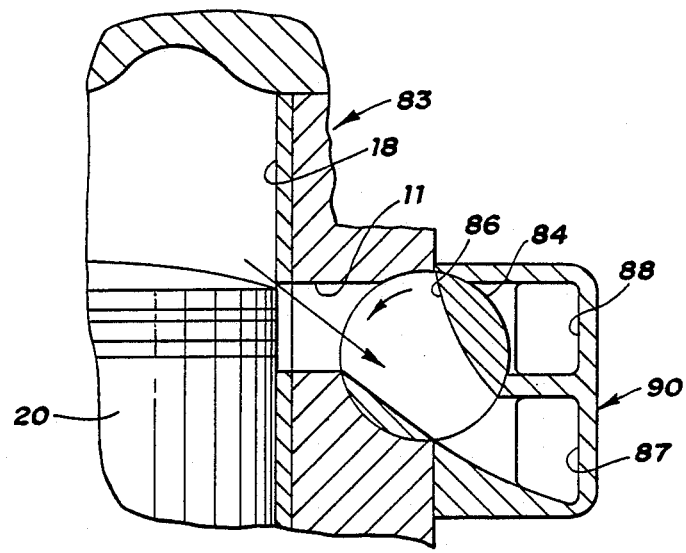
Figure 7:
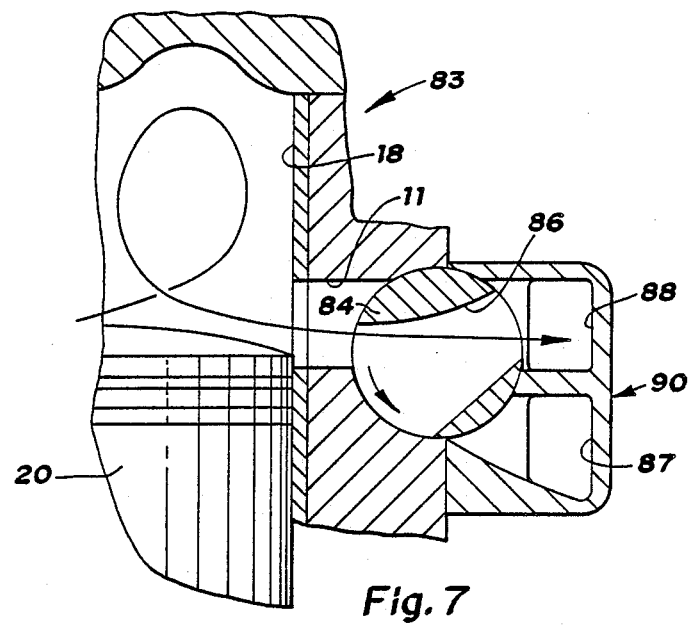

FIGS. 3a–d are pictorial views of an engine cylinder similar to FIG. 2 with the piston and associated exhaust port control in various operating positions;

FIG. 4 is a pictorial view similar to FIG. 3a showing an alternative form of control valve having variable blowdown timing;

FIG. 5 is a pictorial view of an alternative form of pivotal valve;

FIG. 6 is a fragmentary cross-sectional view of a two cycle engine having an alternative rotary valve form of exhaust separation control according to the invention and showing its operation in the blowdown phase;

FIG. 7 is a view similar to FIG. 6 but showing the engine in the scavenge phase.

Figure 8:
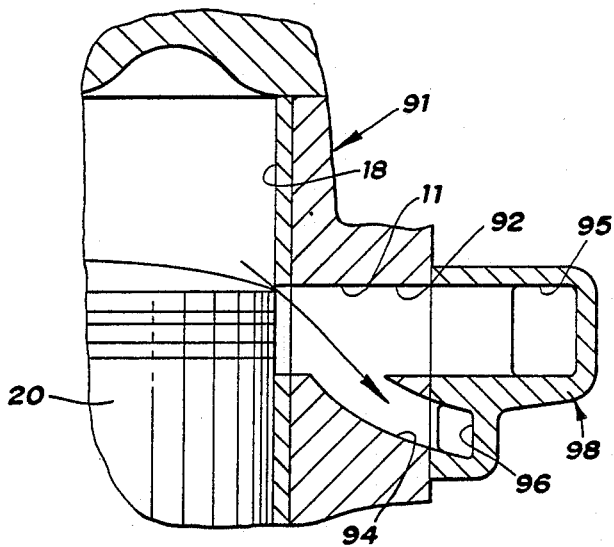
Figure 9:
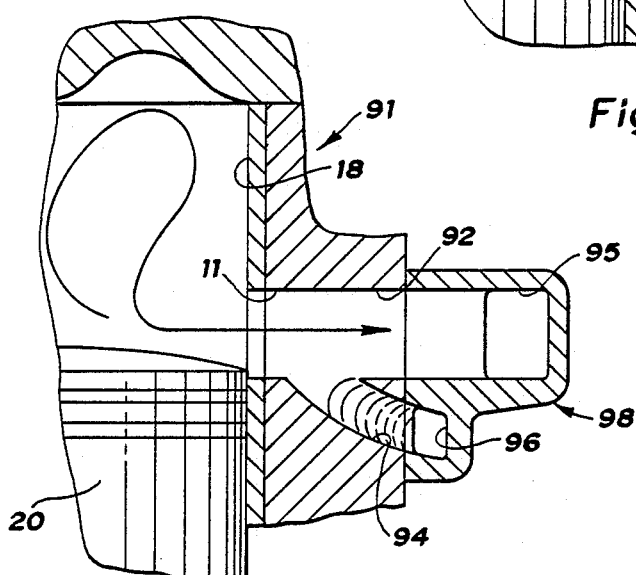
Figure 10:
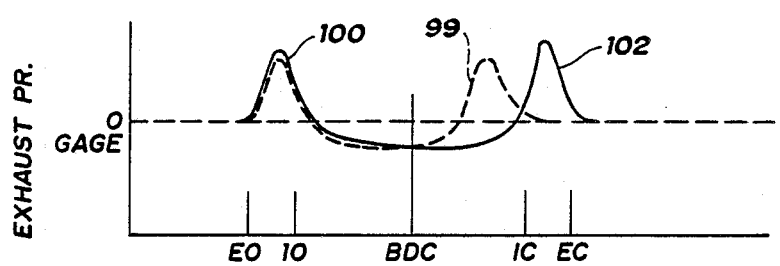

FIG. 8 is a fragmentary cross-sectional view of a two cycle engine having an alternative pressure wave form of exhaust separation control according to the invention showing its operation in the blowdown phase;

FIG. 9 is a view similar to FIG. 8 but showing the engine in the scavenge phase; and FIG. 10 is a conceptual graph of exhaust system pressures during the exhaust phase of the engine of FIGS. 8 and 9;

DETAILED DESCRIPTION—GENERAL

Referring now to the drawings in detail, numeral 10 generally indicates a two-stroke cycle engine according to the invention, hereinafter sometimes referred to for convenience as a two cycle engine. Engine 10 is of a crankcase scavenged, spark ignited, cylinder fuel injected type although other forms of two cycle engines may also be adapted to use various features of the invention.

The engine includes a plurality of cylinder exhaust ports 11, at least one for each cylinder, having means for separating the exhaust gas flow into blowdown and scavenging portions. The blowdown portion comprises that part of the exhaust gas from each exhaust event which is discharged first during the opening of the exhaust port. It consists largely of burned charge, usually with some products of incomplete combustion and excess air, and is at a relatively high temperature dependent upon the rate of combustion and the engine operating conditions. The scavenging portion comprises the remaining part of the gas from each exhaust event. It is at a substantially lower temperature as it includes a substantial amount of bypassed scavenging air that has mixed with the exhaust gas and is forced from the cylinder during the scavenging process.

It should be recognized that the cutoff point between the blowdown and scavenging portions is not clearly defined but may be adjusted at the option of the engine designer, or possibly the operator, to obtain the desired results to be subsequently described. It is also noted that, if desired, the exhaust gas could be further separated to include one or more intermediate portions, the earlier exhausted parts having smaller portions of scavenging air than those exhausted later during each exhaust event.

EMISSION SYSTEM

Figure 1:
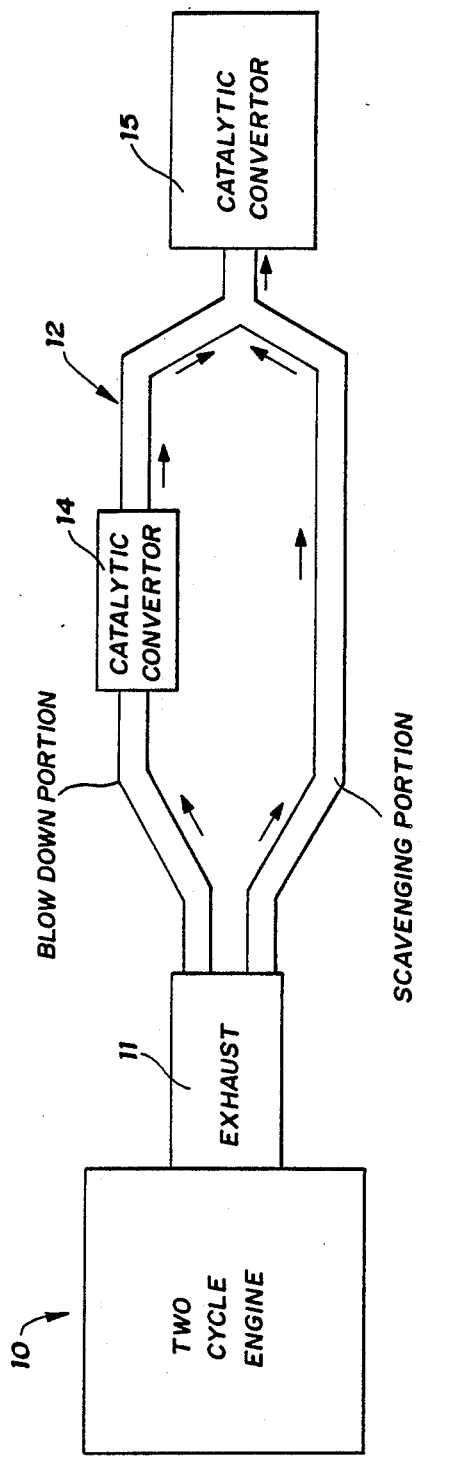
FIG. 1 is a schematic view of a two cycle engine with an exhaust emission control system according to the invention.

As shown in FIGS. 1 and 2, the engine 10 is connected with an emission control system 12, a prime element of which is a first catalytic converter 14 that is connected, preferably in close-coupled fashion, to receive and treat the blowdown exhaust gas. In the preferred form shown in FIG. 1, the treated exhaust gas discharged from the first converter 14 is mixed with the exhaust gas scavenging portion discharged from the engine and the mixture is passed through a second catalytic converter 15 for the purpose of treating the remaining emission products.

In operation, when a cold engine is started, the separate catalytic treatment of the hotter blowdown gases allows the first converter 14 to reach its operating temperature faster than would be possible if all the exhaust gases were mixed together. The exothermic operation of the first converter further heats the treated blowdown gases so that when they are mixed with the cooler scavenge gases, the mixture is warmed further by the added heat of the first converter. The second converter 15 is thereby aided in reaching its operating temperature earlier. Thus the exhaust emissions from the engine reach the operating control condition sooner than would be the case if a single converter were connected to treat all the exhaust gas together without providing additional heating means. The exhaust gas separation also results during extended idle and light load operation in maintaining the first converter 14 hot enough to provide continued effective emission control.

In particular cases, it may be desirable to modify the described emission system. For example, the scavenging portion of the gas could be separately treated without mixing with the treated blowdown gas or, in some cases, treatment of the blowdown gas alone may provide adequate emission control. Such modifications and others that may become apparent are intended to be encompassed within the present invention.

ENGINE ARRANGEMENT

FIG. 2 shows a preferred arrangement of the engine and emission control system of the present invention. The engine 10 includes a cylinder block 16 having a plurality of cylinders 18, only one of which is shown. The cylinders 18 may comprise cast iron or alloy liners inserted or cast into an aluminum block 16 which includes coolant passages 19 adjacent to the upper portions of the cylinder bore.

Pistons 20 are supported for reciprocation within the cylinders 18 and are connected by connecting rods 22 to a crankshaft 23. The crankshaft is rotatably journaled within a crankcase 24 defined, at least in part, by the lower portion of the cylinder block 16 and separated longitudinally into individual crankcase chambers 25 located beneath each of the cylinders 18.

The upper ends of the cylinders 18 are closed by a cylinder head 26 mounted on the cylinder block. The head 26 cooperates with the cylinders 18 and the heads of the pistons 20 to form working chambers 27 that include at their upper ends, combustion chambers 28 primarily defined by recesses in the cylinder head 26. A fuel injection nozzle 30 is fixed to the cylinder head near the top of each combustion chamber to deliver atomized fuel thereto, preferably with a pressurized air charge in known manner. A spark plug, not shown, is also provided to ignite air-fuel mixtures formed in the combustion chamber.

Fresh air charges are delivered to each crankcase chamber 25 during upward movement of its respective piston 20 from an air inlet manifold 31 through an associated intake port 32 formed in the cylinder block. A reed-type valve 34 in the intake port 32 prevents reverse flow. The downstream end of each intake port 32 communicates through a piston controlled opening 35 with its respective crankcase chamber 25 as the piston approaches its top dead center position.

A plurality of main scavenge passages 36 extend from each of the crankcase chambers 25 through the cylinder block 16 and scavenge ports 38 in the respective cylinder to discharge into its working chamber 27 when the piston approaches its bottom dead center position. The scavenge ports 38 are configured to direct the scavenge and intake charges toward one side of the cylinder from which they are deflected in an upward direction toward the combustion chamber 28.

An auxiliary intake or boost port 39 extends directly from the intake port 32 into the working chamber when the piston is near bottom dead center. The boost port is also configured to assist the direction of the intake charge toward the combustion chamber as previously described.

An exhaust port 11 opens through the side of each cylinder opposite to the area where the scavenge charge impinges and the boost port 39 is located. The exhaust port 11 extends in the cylinder somewhat above the scavenging and boost ports 38, 39 in the direction of the combustion chamber so that the exhaust port is opened first as the piston moves downward on its expansion stroke. The port 11 communicates through a valve chamber 42 with an exhaust manifold and emission control system in accordance with the invention as will be subsequently more fully described.

In operation of the engine portions so far described, air is drawn into each crankcase chamber 25 on the upstroke of its respective piston 20 while a previous air charge is being compressed and mixed with atomized fuel injected after the closing of the cylinder ports. Near top dead center, the air-fuel mixture is ignited by the spark plug and burns as the piston begins its downstroke.

As the burned gas expands, the piston uncovers first the top of the exhaust port 11, causing the cylinder pressure to drop as a hot blowdown pulse of burned gas is forced out of the cylinder. Shortly thereafter, the scavenging and boost ports 38, 39 are opened and the slightly pressurized air charge in the associated crankcase chamber is forced into the cylinder. This forces the remaining burned gas and some of the scavenging air out of the cylinder through the exhaust port 11 while a fresh charge of air is left in the cylinder, ready for the next compression stroke.

EXHAUST VALVE

In accordance with the invention, a separating and timing device or exhaust valve 43 is located in the valve chamber 42 and is pivotable on an axis 44 spaced outward of the cylinder 18 and transverse to the cylinder axis 46. The valve 43 includes a separating wall or splitter 47 that, in a lower position, extends from the axis 44 into and laterally across the exhaust port 11, separating it into upper and lower sections. Spaced above the splitter 47 within the port is a timing shroud 48 that, along with the splitter 47, has an inner surface nearly coplanar with the interior surface of the associated cylinder when the valve is in its lower position.

In the preferred embodiment of FIGS. 2 and 3a-d, the valve 43 is provided with upstanding side walls 50 that extend from the pivot axis 44 to the port 11 and support the shroud 48 at a fixed distance above the inner edge of the splitter 47. A stop 51 may be provided extending downward from one of the side walls 50 to engage an abutment 52 of the block and thereby limit the downward motion of the valve 43. An actuating lever 54 connects with a shaft 55 that lies along the valve axis 44 and preferably engages the valves 43 for each of the engine cylinders. In the drawings, the lever 54 extends upwardly so that outward movement thereof pivots the valve upwardly from its lower position toward an upper position (shown in dashed lines in FIG. 2) where the splitter 47 is near the upper edge of the exhaust port 11.

Figure 3B:
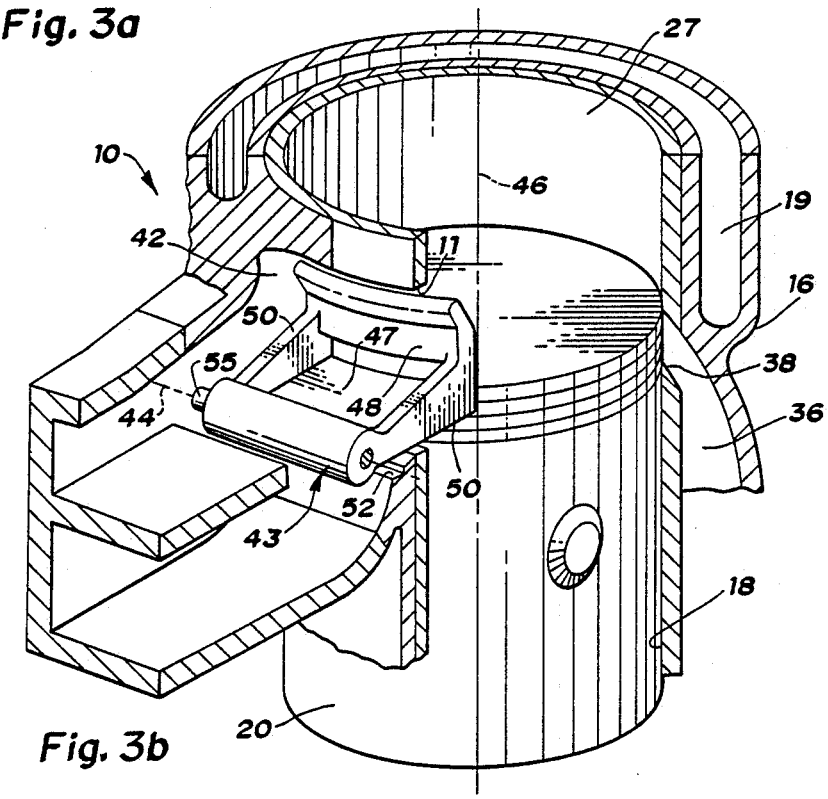
Figure 3C:
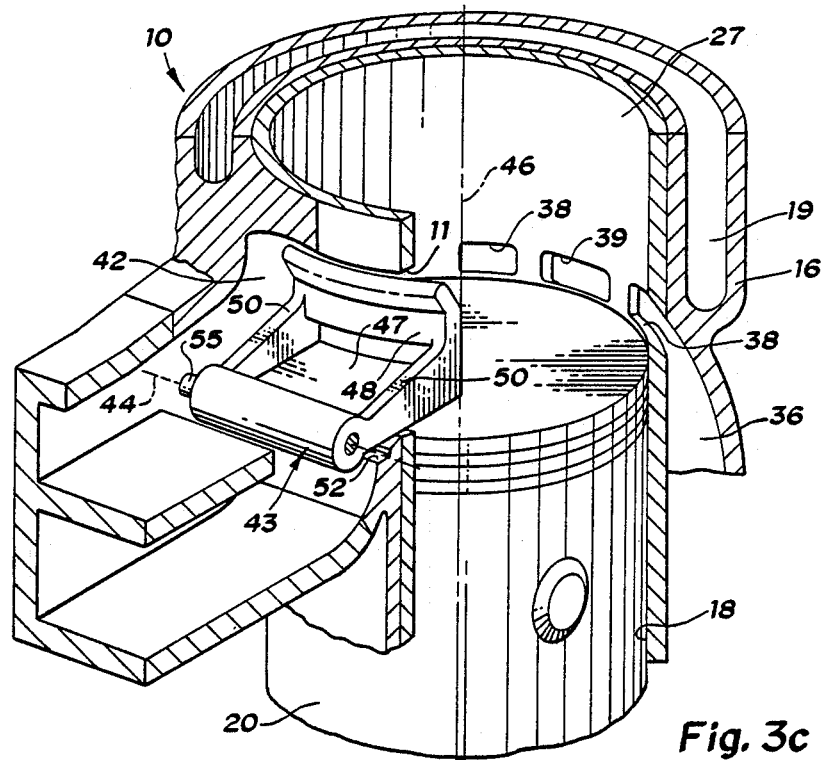

In operation, the movement of the valve is effective to vary the timing of the blowdown pulse through raising and lowering of the shroud 48. The lowest position, shown in FIGS. 3a-3c, is preferred for low speed and light load operation with high efficiency. FIG. 3a shows the piston 20 on its downstroke prior to uncovering the exhaust port 11 so that there is no exhaust flow. In FIG. 3b, the piston has dropped to the level of the splitter 47, directing the blowdown portion of the exhaust through the upper portion of the valve chamber but blocking flow through the lower portion.

In FIG. 3c, the piston has moved to the bottom of its stroke, allowing exhaust flow to pass through both the upper and lower portions of the valve chamber. However passage of this scavenging portion of the exhaust primarily through the lower portion will be encouraged by the earlier directing of the higher pressure blowdown gases through the upper portion and the higher back pressures that are likely to result in the upper portion. The fixed spacing between the shroud 48 and the splitter 47 is chosen to obtain the most desirable operating characteristics of the associated emission control system.

Thus, the splitter 47 acts to separate the blowdown portion of the exhaust gas from the scavenging portion, the two portions being primarily directed into separate parts of the valve chamber 42 which are respectively above and below the splitter. This function is most effective when the valve 43 is in its lowest position as would be the case for lower speeds where highest efficiency is desired.

Figure 3D:
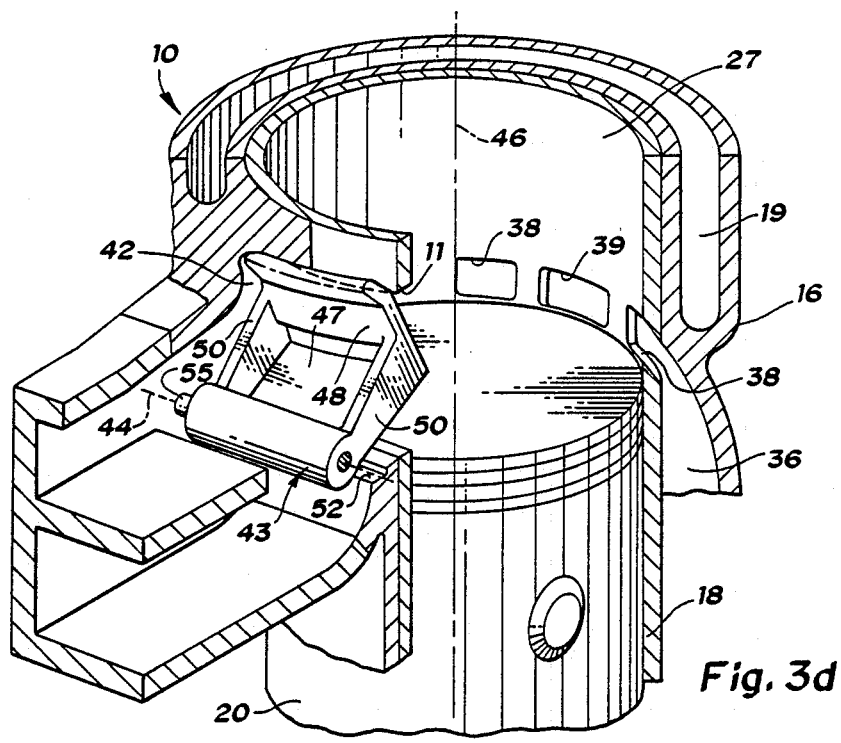

As the valve 43 is tilted upward, the exhaust blowdown timing is advanced as desired for higher speed and heavier load operation. The shroud 48 and splitter 47 also move farther away from the piston side, allowing more leakage between the sections, but this should be less of a problem at the higher speeds. When the valve is fully raised, as shown in FIG. 3d, the splitter 47 approaches the top of the cylinder exhaust port 11 so that nearly all of the exhaust flow is through the lower portion of the exhaust valve chamber 42.

If necessary or desired, the splitter can be made to overtravel upward to block the flow through the upper portion and block all flow to the close coupled converter. This feature can be used to protect the close coupled converter against operation at excessive temperatures if that should be a problem.

ALTERNATIVE VALVES

FIG. 4 illustrates an alternative valve 56 which is similar to the exhaust valve 43 except that the splitter 58 is separately pivotable on the axis 44 from the side walls 50 and timing shroud 48 which remain otherwise similar to the preferred embodiment. Separate levers 54, 59 mounted on concentric shafts may be connected to move the shroud and splitter respectively independently from one another. In this way, the positioning of the shroud 48 and splitter 58 and the spacing between them may be varied as desired according to the requirements of various engine design and operating conditions.

FIG. 5 shows another embodiment of exhaust valve indicated by numeral 60 which could be used in accordance with the invention. In valve 60, a splitter 62 and shroud 63 are separately connected in fixed relation to a common hub 64 by solid and perforate walls 66 and 67 respectively. An opening 68 in the wall 67 allows blowdown gases to pass to the upper portion of the valve chamber 42 in which the valve 60 may be installed, the sides of the chamber being relied on to limit leakage around the solid wall 66.

It should be apparent that the embodiment of FIG. 5 could also be modified to provide independent pivotal movement of the shroud and splitter in a manner similar to the embodiment of FIG. 4.

EXHAUST MANIFOLD

Referring again to FIG. 2, there is shown connected to the valve chambers 42, an exhaust manifold 70 which incorporates specific features forming part of the previously described emission control system 12. Manifold 70 includes a plurality of dual legs 71 having upper and lower passages 72, 74 respectively. The legs 71 attach directly to the housings of the valve chambers 42 of the various engine cylinders, the upper passages 72 and lower passages 74 connecting respectively with the upper and lower sections of their connected valve chambers.

The lower passages 74 also connect with a lower log or plenum 75 that directly feeds an outlet duct 76. The upper passages 72 connect with an upper plenum 78 above which is mounted a catalytic converter element which comprises the first catalytic converter 14 of the system 12 previously described. A cover 80 on the manifold portion housing the element 14 connects the outlet thereof through a transfer duct 82 to the outlet duct 76. The duct 76 is adapted for connection with an exhaust conduit, not shown, which will preferably include a second catalytic converter 15 as previously described.

In operation, the upper passages 72 receive the blowdown portion of the exhaust gas from the upper sections of the valve chambers 42 and direct them through the close coupled catalytic element 14. The reacted products are then mixed in the outlet duct 76 with the scavenging portion of the exhaust carried through the lower passages 74 and delivered to the second converter 15 in the exhaust conduit.

ALTERNATIVE SYSTEMS

In addition to the engine arrangements so far described, various other arrangements may be used for separating the blowdown and scavenging gases or portions thereof for use in exhaust emission control systems according to this invention.

FIGS. 6 and 7 show an engine 83 having one possible alternative arrangement in which the exhaust port 11, controlled by the piston 20 in the cylinder 18, connects with a rotary valve 84 having a through passage 86 that sequentially connects the port 11 with lower passages 87 and upper passages 88 of an associated exhaust manifold 90.

The valve 84 is timed with the engine crank rotation so that during discharge of the blowdown portion of the exhaust gases, in the period shown in FIG. 6 shortly after the piston 20 begins to uncover the exhaust port 11, the valve passage 86 directs the blowdown gases into the lower passages 87 of the manifold 90. Later, as the piston moves downward as shown in FIG. 7 and scavenging air is added through scavenge ports, not shown, the valve 84 directs the scavenging gases into the manifold upper passages 88. The separated gases may then be treated in any suitable manner, such as in an emission control system according to the present invention.

FIGS. 8 and 9 show an engine 91 having another possible alternative arrangement in which the exhaust port 11, controlled by the piston 20 in the cylinder 18, has dual connecting passages 92, 94 that connect respectively with upper passages 95 and lower passages 96 of an associated exhaust manifold 98.

The lower connecting passage 94 is positioned so that, as shown in FIG. 8, it is aligned with the primary direction of discharge of the blowdown portion of the exhaust gases in the period shortly after the piston 20 begins to uncover the exhaust port 11. Thus the lower connecting passage 94 directs the blowdown gases into the lower passages 96 of the manifold 98.

Later, as the piston moves downward as shown in FIG. 9 and scavenging air is added through scavenge ports, not shown, the radial alignment of the upper connecting passage 92 with the exhaust port 11 helps direct the scavenging gases into the manifold upper passages 88. This is assisted by the action of pressure waves in the manifold (as shown in FIG. 10) which is designed to cause a positive wave reflection 99 of the blowdown pulse 100 to occur in the lower blowdown connecting passage 94 during the scavenging portion of the exhaust flow. The wave reflection 102 occurring in the upper scavenging connecting passage 92 is timed by design of the manifold 98 to occur after the scavenging period.

The separated gases may subsequently be treated in any suitable manner, such as in an emission control system according to the present invention.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. An emission control system in combination with a two-stroke cycle engine of the type having a cylinder with a piston controlled exhaust port, means for admitting scavenging air during an open period of the exhaust port and means for supplying fuel to the cylinder, said emission control system comprising first and second exhaust passages connected with the exhaust port, separating means for delivering into said first passage a first blowdown portion of the gas exhausted through the port during an exhaust-scavenging portion of each cycle and for delivering into said second passage a second scavenging portion of the gas exhausted through the port during the exhaust-scavenging portion of each cycle, first exhaust treatment means connected with said first passage for treating exhaust gases delivered to said first passage, and second exhaust treatment means connected with said second passage and with an outlet of said first exhaust treatment means for treating a mixture of gases from said second passage and from said first treatment means, wherein said first treatment means is effective to cause an exothermic reaction in the first passage gases causing a temperature increase which increases the temperature of the subsequently mixed gases and aids the operation of the second treatment means.

2. A combination as in claim 1 wherein said separating means includes an open entrance portion between said port and said passages with adjacent entrances to said passages, said first passage being tuned to develop a positive pressure wave reflection at its entrance during discharge through the port of the exhaust gas scavenging portion to preferentially urge the scavenging flow into the second passage entrance, the second passage being tuned to delay a positive wave reflection until after that of the first passage.

3. A combination as in claim 2 wherein said first passage entrance is positioned in line with the direction of initial discharge of the blowdown portion from the port to preferentially direct the blowdown portion into said first passage.

4. A combination as in claim 1 wherein said separating means includes an open entrance portion between said port and said passages with adjacent entrances to said passages and a timed valve coacting with said entrances to positively direct the blowdown portion into the first passage and the scavenging portion into the second passage.

5. A combination as in claim 4 wherein said timed valve is a rotary valve.

6. A combination as in claim 1 wherein said exhaust treatment means are catalytic converters.

7. A combination as in claim 1 wherein said separating means includes a splitter wall coacting with said port and having opposite sides respectively bordering said first and second passages.

8. A combination as in claim 7 and further comprising a pivotally mounted port timing shroud coacting with said port to adjustably vary the effective position of the port leading edge and control the timing of the beginning of the exhaust blowdown portion.

9. A combination as in claim 8 wherein said splitter wall is pivotally mounted together with said timing shroud and is spaced therefrom at a predetermined distance adjacent said port to control the timing of the exhaust blowdown portion delivery.

10. A combination as in claim 9 wherein said splitter wall is movable with respect to said timing shroud to vary the predetermined distance between them and the timing of the exhaust blowdown portion delivery.

11. A combination as in claim 7 wherein said timing shroud is movable with respect to said splitter wall to vary the predetermined distance between them and the timing of the exhaust blowdown portion delivery.

12. A two-stroke cycle engine of the type having a cylinder with a piston controlled exhaust port, means for admitting scavenging air during an open period of the exhaust port and means for supplying fuel to the cylinder, said engine comprising first and second exhaust passages connected with the exhaust port, separating means including a splitter wall coacting with said port and having opposite sides respectively bordering said first and second passages for delivering into said first passage a first blowdown portion of the gas exhausted through the port during an exhaust-scavenging portion of each cycle and for delivering into said second passage a second scavenging portion of the gas exhausted through the port during the exhaust-scavenging portion of each cycle, and a pivotally mounted port timing shroud coacting with said port to adjustably vary the effective position of the port leading edge and control the timing of the beginning of the exhaust blowdown portion, said timing shroud being movable with respect to said splitter wall to vary the predetermined distance between them and to vary the timing of the exhaust blowdown portion delivery.

13. A two-stroke cycle engine of the type having a cylinder with a piston controlled exhaust port and means for admitting scavenging air during an open period of the exhaust port, said engine comprising first and second exhaust passages connected with the exhaust port, separating means for delivering into said first passage a first blowdown portion of the gas exhausted through the port during an exhaust-scavenging portion of each cycle and for delivering into said second passage a second scavenging portion of the gas exhausted through the port during the exhaust-scavenging portion of each cycle, said separating means including a splitter wall coacting with said port and having opposite sides respectively bordering said first and second passages, and a pivotally mounted port timing shroud coacting with said port to adjustably vary the effective position of the port leading edge and control the timing of the beginning of the exhaust blowdown portion, said splitter wall being pivotally mounted together with said timing shroud and spaced therefrom at a predetermined distance adjacent said port to control the timing of the exhaust blowdown portion delivery, and said splitter wall being movable with respect to said timing shroud to vary the predetermined distance between them and to vary the timing of the exhaust blowdown portion delivery.

14. A two-stroke cycle engine of the type having a cylinder with a piston controlled exhaust port and means for admitting scavenging fluid during an open period of the exhaust port, said engine comprising first and second exhaust passages connected with the exhaust port, separating means for delivering into said first passage a first blowdown portion of the gas exhausted through the port during an exhaust-scavenging portion of each cycle and for delivering into said second passage a second scavenging portion of the gas exhausted through the port during the exhaust-scavenging portion of each cycle, said separating means including an open entrance portion between said port and said passages with adjacent entrances to said passages, said first passage being tuned to develop a positive pressure wave reflection at its entrance during discharge through the port of the exhaust gas scavenging portion to preferentially urge the scavenging flow into the second passage entrance, the second passage being tuned to delay a positive wave reflection until after that of the first passage.

15. A combination as in claim 14 wherein said first passage entrance is positioned in line with the direction of initial discharge of the blowdown portion from the port to preferentially direct the blowdown portion into said first passage.

16. A two-stroke cycle engine of the type having a cylinder with a piston controlled exhaust port and means for admitting scavenging fluid during an open period of the exhaust port, said engine comprising first and second exhaust passages connected with the exhaust port, separating means for delivering into said first passage a first blowdown portion of the gas exhausted through the port during an exhaust-scavenging portion of each cycle and for delivering into said second passage a second scavenging portion of the gas exhausted through the port during the exhaust-scavenging portion of each cycle, said separating means including an open entrance portion between said port and said passages with adjacent entrances to said passages and a timed valve coacting with said entrances to positively direct the blowdown portion into the first passage and the scavenging portion into the second passage.

17. A combination as in claim 16 wherein said timed valve is a rotary valve.

* * * * *